Feb. 6, 1923.

H. L. HIRSCHLER.
TRAILER BRAKE MECHANISM.
FILED APR. 21, 1920.

Inventor.
Horace L. Hirschler
by White, Prost & Evans
his attorney.

Patented Feb. 6, 1923.

1,444,316

UNITED STATES PATENT OFFICE.

HORACE L. HIRSCHLER, OF SAN FRANCISCO, CALIFORNIA.

TRAILER-BRAKE MECHANISM.

Application filed April 21, 1920. Serial No. 375,423.

*To all whom it may concern:*

Be it known that I, HORACE L. HIRSCHLER, a citizen of the United States, and a resident of the city and county of San Francisco and State of California, have invented a new and useful Trailer-Brake Mechanism, of which the following is a specification.

My invention relates to motion transmitting apparatus and particularly to an apparatus comprising a secondary motor actuated by fluid pressure from a primary motor to which it is flexibly connected, the secondary motor being adapted to be releasably coupled to mechanism the operation of which it is desired to control from the primary motor. While in the present application, I shall describe my invention as arranged for the control of the brake on a trailer from the driver's seat on the truck, it will be apparent that my invention can be used for the control of other devices from a distance, by means of a secondary motor capable of being releasably coupled with the device to be controlled.

The growth of motor transportation and the increasing use of trailers have made it necessary to equip such trailers with brakes and to place within the driver's control means for controlling them. Such brake controlling apparatus must be designed to give quick and effective control despite the varying positions of the two vehicles. It is therefore one of the objects of my invention to provide means for controlling the brakes of a trailer operable from the driver's seat and which is unaffected by movement of the trailer relative to the truck. Another object of the invention is to provide a device of the character described which is automatically released from its coupled connection on the trailer, in the event that the coupling between the vehicles is broken; the brakes of the trailer being simultaneously and automatically set.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is an elevation, and Figure 2 a plan view of a trailer and the rear end of a truck showing the application of my brake controlling apparatus. Figure 3 is an extension of Figure 1 showing a portion of the front end of the truck and the primary motor.

In general terms, my invention comprises a motion transmitting device or primary motor arranged on the truck with control lever convenient to the hand of the driver, a secondary motor adapted to be operated by fluid under pressure from the primary motor and arranged on the end of a flexible conductor at the rear end of the truck, and means on the trailer for actuating the brakes, with which the secondary motor is releasably coupled. Thus in order to connect the trailer brakes with the primary motor it is only necessary to seat the secondary motor in a socket suitably disposed on the trailer, the connection being established by the automatic interlocking of parts. Unseating the secondary motor from its socket ipso facto breaks the connection. The required flexibility between the two vehicles is maintained by the flexible conduit. Any of the known motion transmitting devices and motors may be used in connection with my apparatus, such as those illustrated and described in Letters Patent of the United States, No. 976,907 of Nov. 29, 1910. Means are also provided for automatically releasing the secondary motor from its socket, and setting the brakes of the trailer with the separation of the two vehicles, either through breaking of the coupling links, or uncoupling the connection between them.

Figures 1, 2, 3:
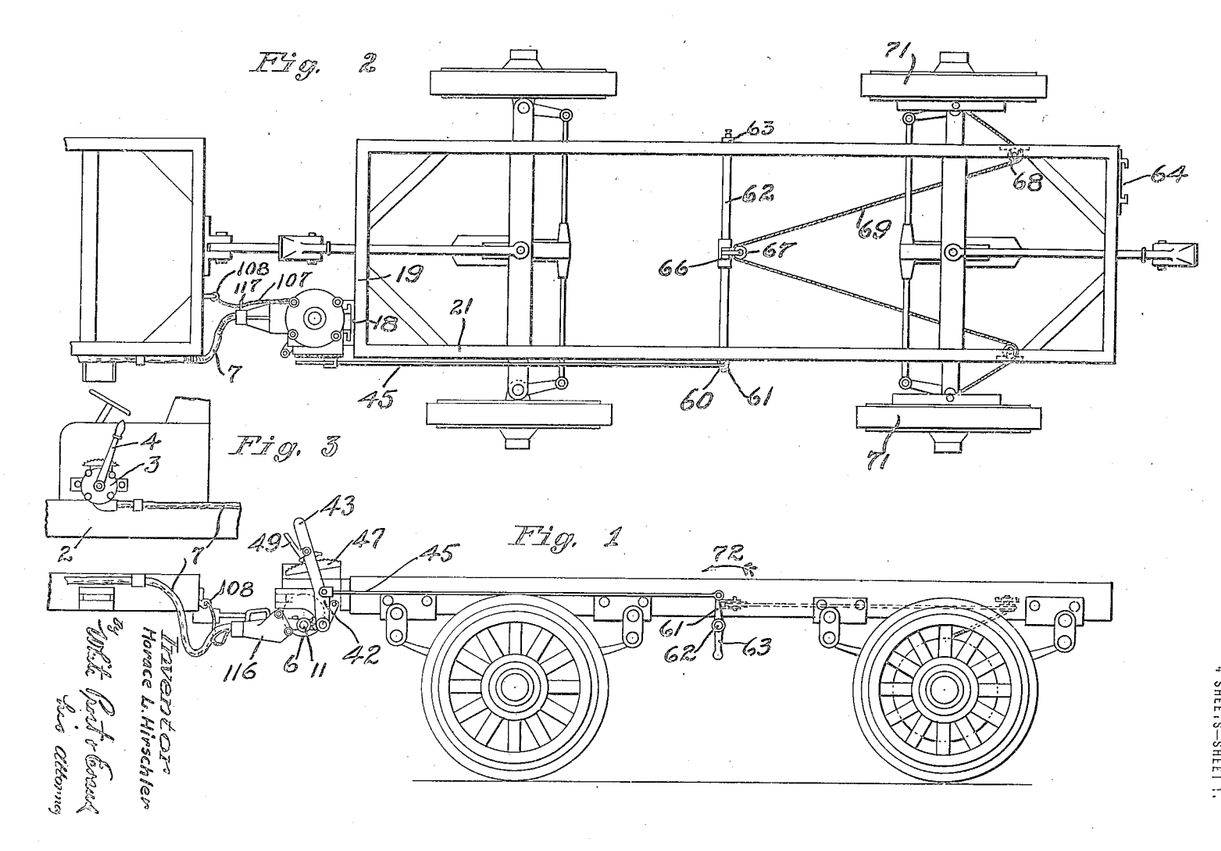

Mounted on the truck frame 2, Figure 3, is a motion transmitting device or primary motor 3 of known form and preferably that referred to above. An operating lever 4 for such device is arranged convenient to the hand of the driver.

A secondary motor 6, Figure 1, of known type adapted to be actuated by liquid under pressure from the primary motor 3 is arranged at the end of the flexible conduit 7 disposed on the truck frame. Flexible liquid conductors within the conduit 7, connect the primary motor to nipples 8 and 9, Figure 4, of the secondary motor, so that when the operating lever 4 is moved, the shaft 11 on the secondary motor is turned. The casing of the secondary motor is provided on each side with horizontal slides 12, Figure 10, for supporting the motor within the socket between fixed ledges 13 above, and pivoted arms 14 below, on which the motor is carried.

Figures 7, 8, 9, 10, 11, 12:
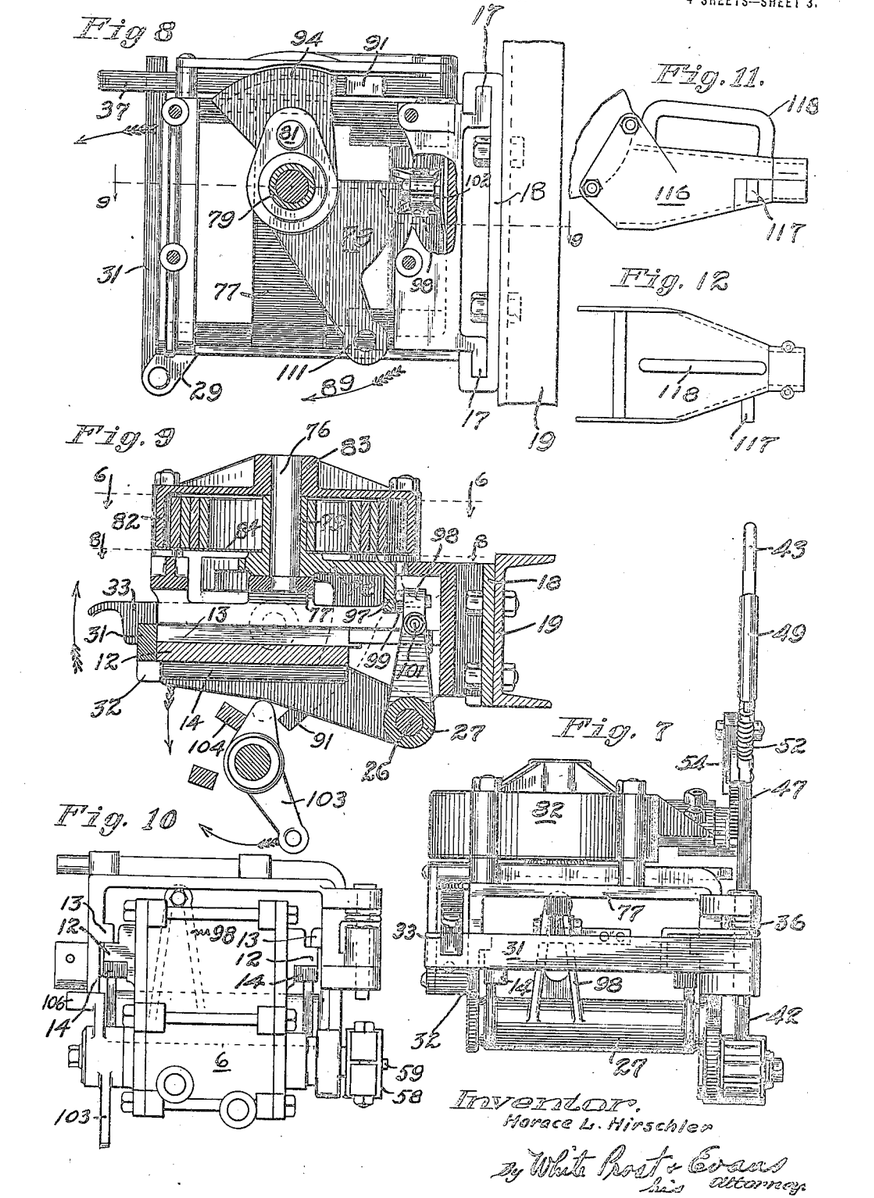
Figure 7 is a front elevation of the secondary motor socket.
Figure 8 is a horizontal sectional view of the secondary motor socket taken in the plane indicated by the line 8—8 of Figure 9.
Figure 9 is a vertical sectional view of the secondary motor socket taken in the plane indicated by line 9—9 of Figure 8.
Figure 10 is a front elevation of a portion of the socket showing the motor in place.
Figures 11 and 12 are left side elevations and plan respectively of the connection hood fixed on the secondary motor.
Figures 13, 14, 15:
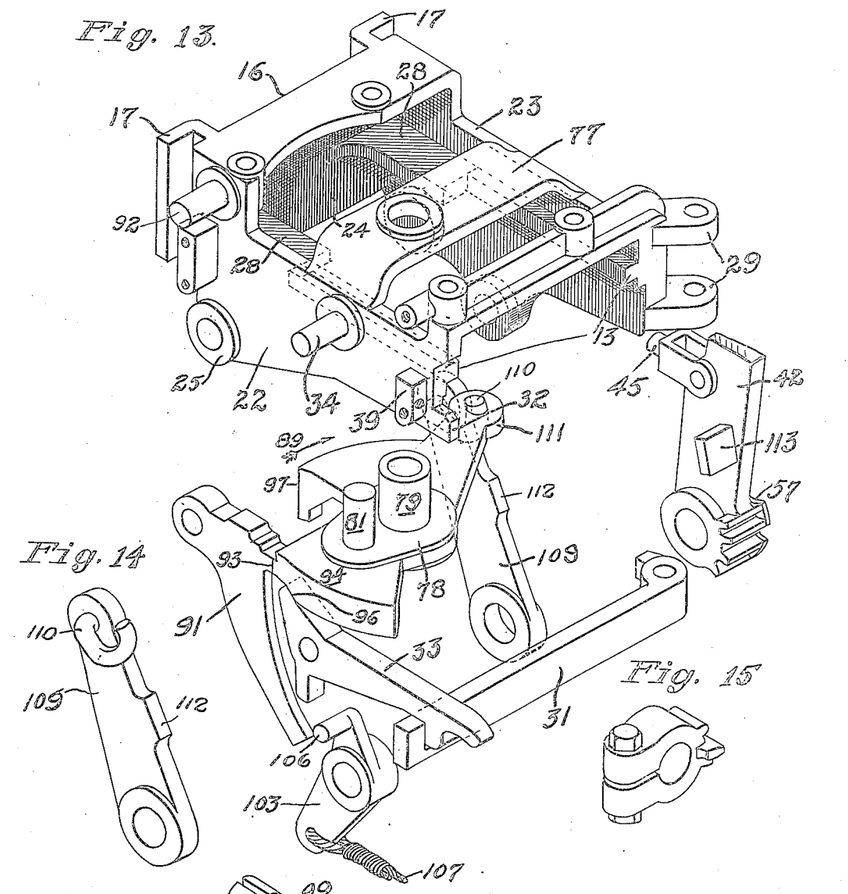
Figure 13 is an isometric projection of portions of the secondary motor socket, separated, but in line with their normal assembled positions.
Figures 14, 15 and 16 are isometric projections of detached portions of the mechanism.
Figure 16:
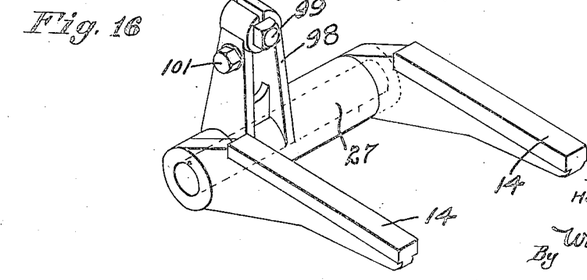

The socket comprises a box-like frame 16, Figure 13, having flanges 17 to adapt the socket for ready interlocked connection to the base plate 18, Figure 8, formed to receive the flanges, and secure to the end member 19 of the trailer frame 21. Two parallel vertical walls 22 and 23 extend outwardly from the end wall 24 of the frame, and are provided with the ledges 13, and the mountings 25 for the pivot pin 26 upon which the connecting sleeve 27 of the motor supporting arms 14 turns. Webs 28, Figure 13 reenforce the frame and provide shoulders for limiting the movement of the motor when it is thrust into the socket.

Figure 4:
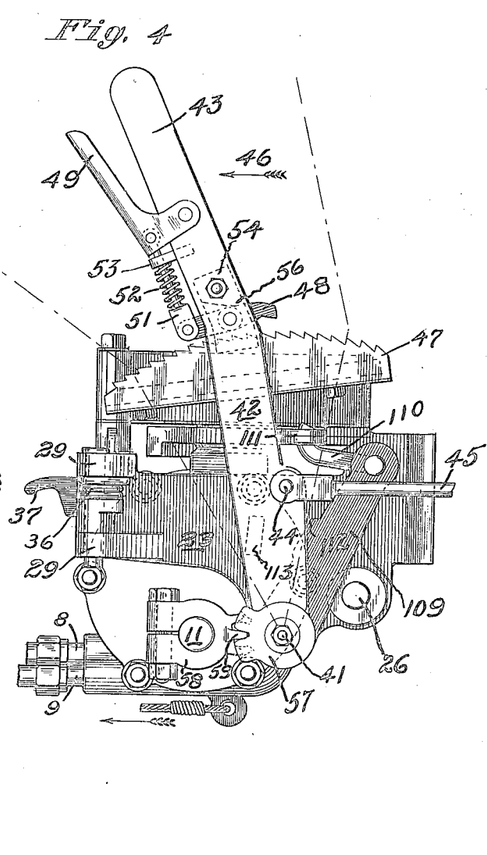
Figures 4 and 5 are respectively right and left elevations of the motor and socket in which the motor lies when operative.
Figures 5, 6:
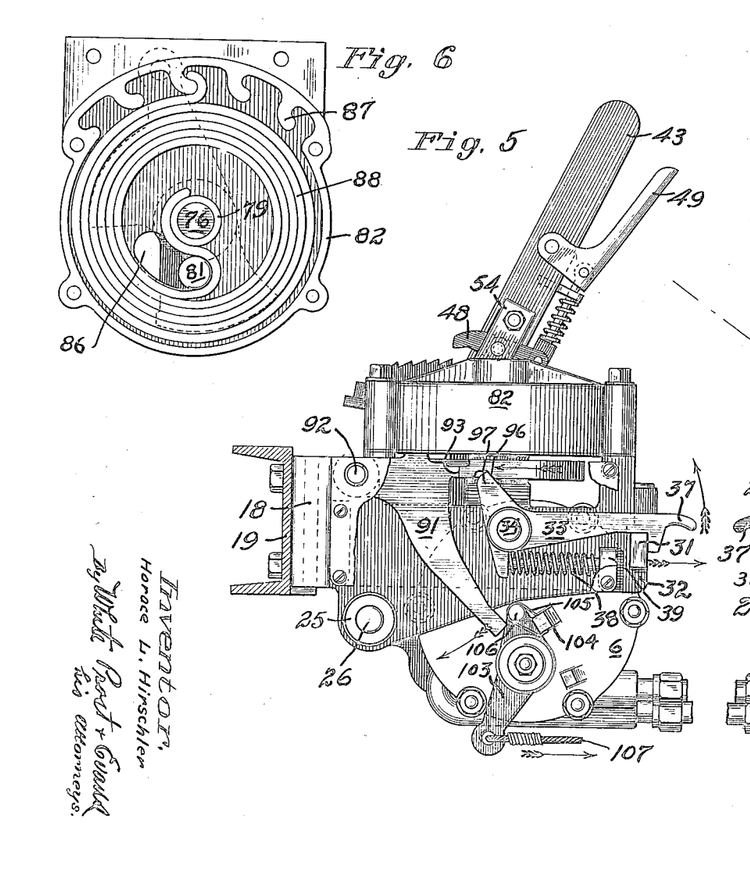
Figure 6 is a horizontal sectional view of the secondary motor socket taken in the plane indicated by the line 6—6 of Figure 9.

Means are provided for preventing the accidental withdrawal or unseating of the secondary motor from its socket. Pivoted to lugs 29 on the side wall 23 of the socket is a gate 31 formed at the other end to seat upon the lug 32 on the end of the side wall 22. The gate is retained in the closed position by latch 33, Figure 5, mounted on pivot pin 34 fixed in the side wall 22. A spring 36, Figure 4, interposed between gate and lugs is in tension when the gate is closed, and throws it open when the latch is raised. The latch is provided with a finger grip 37, whereby it may be manually raised to release the gate; and a spring 38, Figure 5, is interposed between the latch and a lug 39 on the side wall to resiliently retain the latch in engagement with the gate.

Arranged on the stud 41 fixed on the wall 23 is a lever 42 terminating in a handle 43. The lever is connected by pivot pin 44 with the rod 45 connected to the brake mechanism of the trailer, so that movement of the lever in the direction of the arrow 46 sets the brakes. Fixed on a portion of the device is a toothed segment 47 adapted to be engaged by the latch 48 pivoted on the brake lever, so that the lever may be held by the latch in any position to which it is pushed to set the brakes. The latch does not operate automatically when the brake is operated by the driver of the truck, but only when the trailer is detached from the truck and the brakes are set by hand. The handle 43 is provided with the grip 49 attached to the latch by the link 51. A spring 52 interposed between the link and a lug 53 on the lever normally resiliently retains the latch above the teeth of the segment, but on grasping the handle and grip to set the brakes the latch is engaged with the teeth, the tension on the rod 45, with the brakes set, then being sufficient to keep the latch engaged. The brake lever 42 thus provides means for independent operation of the brakes when the trailer is detached.

It will be observed that the tendency of the spring 52 is to free the latch. Obviously then, if the brakes are set by hand and the latch engaged to hold the lever in position, any movement of the lever by the secondary motor will release the latch, the brakes then being capable of control by the secondary motor. This feature is valuable in enabling the driver from his seat to release the brakes previously set by hand, by a slight movement of the secondary motor.

A plate 54 bolted to the inside face of the lever provides an additional bearing for the latch pivot pin and also a stop 56 against which the latch is held by the spring in the unengaged position. The plate extends downwardly past the edge of the toothed segment and thus acts as a guard preventing lateral displacement of the lever.

Means are provided for connecting the shaft 11 of the secondary motor, with the lever 42 when the secondary motor is thrust into its socket so that the lever is moved to actuate the brakes by operation of the primary motor. Mounted on the stud 41 and fixed to the lever 42 is a gear segment 57. Fixed on the shaft 11 of the secondary motor is a gear segment 58. The two segments are so disposed that when the secondary motor is thrust into its socket, their teeth are meshed or interlocked in which relation, the parts are held by the gate 31. That is to say, when the secondary motor is thrust into its socket the segments automatically interlock and form an operative connection, and this connection is broken only by the withdrawal of the secondary motor.

In order to prevent engagement of the wrong teeth when the secondary motor is pushed into the socket, which would prevent the proper relation of parts in the apparatus as a whole, one of the teeth 59 on the segment 58 is formed wider than the others. The teeth on the segment 57 are shrouded, but for the space in which the wide tooth 59 should engage, the shroud is omitted. Thus the segments can only mesh in the one position which is arranged to give the proper relation of parts, and to effect such meshing, it may be necessary to move the lever 42 a small amount to bring the teeth into alinement.

The rod 45 connected at one end to the lever 42, extends along one side of the frame 21, Figure 2, of the trailer and is releasably connected by a spring clip 60 to the lever arm 61 fixed on the end of a rock shaft 62. The opposite end of the shaft is provided with another lever arm 63 extending in a direction opposite to that of the arm 61, and adapted to be connected with the end of the rod 45. A second base plate 64 similar to base plate 18 is situated at the opposite corner of the trailer frame. When it is desired to couple the truck to that end of the trailer, the rod 45 is detached from lever arm 61 and the entire socket lifted out of base plate 18 and dropped into base plate 64. The end of rod 45 is then connected to lever 63. The secondary motor may then be thrust into the socket. Irrespective of which base plate the socket is in, movement of the shaft 11 when the motor is in the socket is transmitted through the described mechanism and effects a rocking of the shaft 62.

Fixed on the shaft is a lever arm 66 to which is pivotally connected a single sheave block 67. Pivotally arranged on the frame adjacent each wheel at one end of the truck is a pulley 68. A flexible cable 69 is passed about the pulleys as shown in Figure 2 and its ends connected to the levers which operate the brake shoes in a known manner, within the brake drums of the wheels 71. Movement of the shaft 62 in the direction of the arrow 72, Figure 1, places the cable 69 in tension and sets the brakes. Movement of the shaft in the opposite direction permits the releasing springs of the brake shoes to function.

Means are provided for ejecting the secondary motor from the socket and setting the brakes in case the coupling breaks. It will be remembered that the secondary motor rests upon the arms 14 pivoted on the pin 26 and is held within the socket by the gate 31. Means are therefore provided, operating, when the secondary motor is in its socket and the vehicles separate for any reason, to open the gate and to permit the pivoted arms to fall, so that the secondary motor is ejected from the socket by its own weight. Rotatably arranged on a pin 76, Figure 9, fixed in the bridge 77, connecting the side walls of the socket, is a cam plate 78 formed with a cylindrical flange 79 surrounding the pin, and a fixed stud 81, Figure 13. Above the cam and fixed to the socket frame is a housing 82, the upper wall of which is formed with a flange 83 in which the upper end of the pin 76 is seated. The bottom wall of the housing is formed by the plate 84, Fig. 9, provided with a slot 86, Fig. 6, through which the stud 81 extends. One of the side walls of the housing is formed with a series of hook-like lugs 87, adapted to engage the hooked outer end of a flat coil spring 88, the inner end of which is hooked about the stud 81 and then half turned about the flange 79, as shown best in Figure 6. The spring is inserted in its housing under considerable tension and exerts a powerful pressure on the stud, tending to turn the cam in the direction of the arrow 89, Figures 8 and 13. The cam is retained in the position shown by a trigger 91 pivotally mounted on stud 92 fixed on the side wall 22 of the socket, and engaging the lateral face 93 of portion 94 of the cam, Fig. 13. The lower face of this portion of the cam is provided with a cam edge 96 adapted to engage the end of latch 33.

The cam 78 is also provided with a flanged portion 97, which, in the position of parts shown in Figures 8 and 9, is engaged by an arm 98, fixed on the sleeve 27 which connects the motor supporting arms 14. The arm is provided with an adjustable contact 99 locked between the bifurcated ends thereof, by screw 101, and engagement of the arm with the cam, retains the arms 14 in proper position to hold the secondary motor securely. A spring 102, Figure 8, fixed on the rear wall of the socket is placed under tension by the arm 98 when in engagement with the cam, and prevents rattling of the parts and insures rapid dropping of the arms 14 when the arm 98 is released. Thus when the trigger 91 moves downwardly the cam is released and is rotated through a short arc by the spring 88. This rotation permits the arm 98 to disengage the portion 97, so that the supporting arms 14 fall. Simultaneously the face 96 raises the latch 33 so that the gate 31 swings open, thus permitting the secondary motor to fall out of the socket. Means are provided for actuating the trigger. Pivoted on the side of the motor is a lever 103, Fig. 5, normally held against the stop 104, by a thin wire 105, Fig. 5, extending through a hole in the stop and encircling the lug 106 on the lever. The lever is provided with a lug 106 adapted to engage the end of the trigger when the lever is turned on its pivot. A cable 107 shorter than the flexible conductor 7 connects the lever with an eye bolt 108 fixed in the frame of the truck. The cable is sufficiently long to prevent tension thereon in the normal movement of the vehicles, but if for any reason separation of the vehicles takes place while the motor is in its socket, the cable is pulled, rocking the lever and forcing down the trigger. With the release of the cam, the motor is ejected in a manner already made clear, and hangs from the cable 107. Simultaneously with the ejection of the motor, the brakes on the trailer are set. Pivotally mounted on the stud 41 is a lever 109 connected by link 110 with the portion 111 of the cam. The lever as shown in Figs. 4 and 13, is formed with a boss 112 adapted to engage the lug 113 on the inside face of the lever 42 when the lever is thrown forwardly by rotary movement of the cam. Thus when the trigger is pulled to release the cam, besides the results already detailed, the lever 109 is moved into engagement with the lever 42, which it carries forward in the direction of the arrow 46, effecting the setting of the trailer brakes by pressure exerted by spring 88.

Preferably a hood 116, Figures 11 and 12, surrounds the connections of the conduits to the secondary motor. The cable passes from the lever 103 through an eye 117 on the hood so that in all cases the pull of the cable on the lever will be from the proper direction. A bar 118 is provided on the hood to facilitate handling of the secondary motor.

To replace the parts in operative position after a break-away, the driver raises the arms 14 and pushes the lever 42 in a direction contrary to that indicated by arrow 46 to swing back the cam until it latches behind the trigger.

I claim:

1. The combination of a primary fluid pressure motor, a secondary fluid pressure motor actuated by said primary motor, a device to be moved, means for releasably holding said secondary motor in operative engagement with said device, and means for automatically releasing said secondary motor from said operative engagement.

2. The combination of a primary fluid pressure motor, a secondary fluid pressure motor actuated by said primary motor, a device to be moved, means for releasably holding said secondary motor in operative engagement with said device, means for automatically releasing said secondary motor from said operative engagement, and means operating automatically simultaneously with said release for moving said device.

3. The combination of a primary fluid pressure motor, a secondary fluid pressure motor actuated by said primary motor, mechanism to be operated, means for operating said mechanism, means for releasably coupling said secondary motor to said mechanism operating means, and means for automatically uncoupling said secondary motor from said mechanism operating means.

4. The combination of a primary fluid pressure motor, a secondary fluid pressure motor actuated by said primary motor, mechanism to be operated, means for operating said mechanism, means for releasably coupling said secondary motor to said mechanism operating means, means for automatically uncoupling said secondary motor from said mechanism means, and means operating automatically simultaneously with said release for actuating said mechanism operating means.

5. The combination of a primary fluid pressure motor, a secondary fluid pressure motor actuated by said primary motor, mechanism to be operated, means for manually operating said mechanism, means for releasably coupling said secondary motor to said manual operating means, and means for automatically releasing said secondary motor from said manual operating means.

6. The combination of a primary fluid pressure motor, a secondary fluid pressure motor actuated by said primary motor, mechanism to be operated, means for manually operating said mechanism, means for releasably coupling said secondary motor to said manual operating means, means for automatically releasing said secondary motor from said manual operating means, and means operating automatically simultaneously with said release for actuating said mechanism.

7. The combination of a primary fluid pressure motor, a secondary fluid pressure motor actuated by said primary motor, a flexible conduit connecting said motors, mechanism to be operated, means for operating said mechanism, means for releasably coupling said secondary motor to said mechanism operating means, means for automatically uncoupling said secondary motor from said mechanism operating means, and means operating automatically simultaneously with said release for actuating said mechanism operating means.

8. A truck trailer brake controlling apparatus comprising a primary motor on the truck, a secondary motor actuated by the primary motor, a flexible conduit connecting said motors, brake operating means on the trailer, means for releasably coupling the secondary motor to said brake operating means, and means operating automatically with a separation of the truck and trailer for uncoupling said secondary motor from said brake operating means.

9. A truck trailer brake controlling apparatus comprising a primary motor on the truck, a secondary motor actuated by the primary motor, a flexible conduit connecting said motors, brake operating means on the trailer, means for releasably coupling the secondary motor to said brake operating means, means operating automatically with a separation of the truck and trailer for uncoupling said secondary motor from said brake operating means, and means operating automatically simultaneously with said uncoupling means for actuating said brake operating means.

10. The combination of a primary motor, a secondary motor actuated by and flexibly connected to said primary motor, a device to be operated, a socket associated with said device and in which said secondary motor may be releasably seated, means on said socket operatively engaged by said secondary motor when seated therein for actuating said device, and means for automatically releasing said secondary motor from said socket and simultaneously actuating said device.

11. The combination of a primary motor, a secondary motor actuated by said primary motor, a device to be operated, a socket associated with said device and in which said secondary motor may be seated, means connecting said secondary motor to said device, pivoted arms in said socket for supporting said secondary motor, and means for releasing said pivoted arms to cause the ejection of said secondary motor from said socket.

12. The combination of a primary motor, a secondary motor actuated by said primary motor, a device to be operated, means including a frame in which said secondary motor may be seated for operatively engaging said secondary motor with said device, pivoted arms in said frame for supporting said secondary motor, means normally preventing movement of said arms, and means for moving the movement preventing means to release said arms to cause the ejection of said secondary motor from said frame.

13. The combination of a primary motor, a secondary motor actuated by said primary motor, a device to be operated, means including a frame in which said secondary motor may be seated for operatively engaging said secondary motor with said device, pivoted arms in said frame for supporting said secondary motor, means for releasing said pivoted arms to cause the ejection of said secondary motor from said frame and simultaneously actuating said device.

14. The combination of a primary motor, a secondary motor actuated by said primary motor, a device to be operated, means including a frame in which said secondary motor may be seated to operatively engage said device, pivoted arms in said frame for supporting said secondary motor, a gate for preventing the withdrawal of said motor from said frame, and means for releasing said pivoted arms and opening said gate to cause the ejection of said secondary motor from said frame.

15. The combination of a primary motor, a secondary motor actuated by said primary motor, a device to be operated, means including a frame in which said secondary motor may be seated to operatively engage said device, pivoted arms in said frame for supporting said secondary motor, a gate for preventing the withdrawal of said motor from said frame, and means for releasing said pivoted arms and opening said gate to cause the ejection of said secondary motor from said frame and simultaneously actuating said device.

16. The combination of a primary motor, a secondary motor actuated by said primary motor, a device to be operated, means including a frame in which said secondary motor may be seated to operatively engage said device, pivoted arms in said frame for supporting said secondary motor, a pivoted plate for normally preventing movement of said arms, a spring tending to move said plate to release said arms, a trigger for preventing movement of said plate, and means for releasing said trigger.

17. The combination of a primary motor, a secondary motor actuated by said primary motor, a device to be operated, means including a frame in which said secondary motor may be seated to operatively engage said device, pivoted arms in said frame for supporting said secondary motor, a pivoted plate for normally preventing movement of said arms, a spring tending to move said plate to release said arms, a trigger for preventing movement of said plate, a gate for preventing withdrawal of said secondary motor from said frame, a latch for retaining said gate in closed position, means on said plate for releasing said latch, and means for releasing said trigger.

18. The combination of a primary motor, a secondary motor actuated by said primary motor, a device to be operated, means including a frame in which said secondary motor may be seated to operatively engage said device, pivoted arms in said frame for supporting said secondary motor, a pivoted plate for normally preventing movement of said arms, a spring tending to move said plate to release said arms, a trigger for preventing movement of said plate, means for releasing said trigger, and means mediately connecting said plate with said device to be operated whereby the release of said trigger initiates the simultaneous operation of said device and the ejection of said secondary motor.

19. A truck trailer brake controlling apparatus comprising a primary motor on the truck, a secondary motor actuated by and flexibly connected to the primary motor, brake operating means on said trailer, means for releasably supporting said secondary motor on said trailer in operative engagement with said brake operating means, and means operating automatically with a separation of the truck and trailer for releasing said supporting means to eject said secondary motor therefrom.

20. A truck trailer brake controlling apparatus comprising a primary motor on the truck, a secondary motor actuated by and flexibly connected to the primary motor, brake operating means on said trailer, means for releasably supporting said secondary motor on said trailer in operative engagement with said brake operating means, and means operating automatically with a separation of the truck and trailer for releasing said supporting means to eject said secondary motor therefrom and for actuating said brake operating means.

21. A truck trailer brake controlling apparatus comprising a primary motor on the truck, a secondary motor actuated by and flexibly connected to the primary motor, brake operating means on said trailer, pivoted means on said trailer for supporting said secondary motor in operative engagement with said brake operating means, and means operating automatically with a separation of the truck and trailer for releasing said pivoted means to permit said secondary motor to fall therefrom.

22. A truck trailer brake controlling apparatus comprising a primary motor on the truck, a secondary motor actuated by and flexibly connected to the primary motor, brake operating means on said trailer, pivoted means on said trailer for supporting said secondary motor in operative engagement with said brake operating means, and means operating automatically with a separation of the truck and trailer for releasing said pivoted means to permit said secondary motor to fall therefrom and for actuating said brake operating means.

23. A truck trailer brake controlling apparatus comprising a primary motor on the truck, a secondary motor actuated by and flexibly connected to the primary motor, brake operating means on said trailer, pivoted means on said trailer for supporting said secondary motor in operative engagement with said brake operating means, a pivoted plate for normally preventing movement of said pivoted means, a spring tending to move said plate to release said pivoted means, a trigger for preventing movement of said plate, and means operating automatically with a separation of the truck and trailer for moving said trigger to release the plate.

24. A truck trailer brake controlling apparatus comprising a primary motor on the truck, a secondary motor actuated by and flexibly connected to the primary motor, brake operating means on said trailer, pivoted means on said trailer for supporting said secondary motor in operative engagement with said brake operating means, a pivoted plate for normally preventing movement of said pivoted means, a spring tending to move said plate to release said pivoted means, a trigger for preventing movement of said plate, means operating automatically with a separation of the truck and trailer for moving said trigger to release the plate and means mediately connecting said plate with said brake operating means.

25. A truck trailer brake controlling apparatus comprising a primary motor on the truck, a secondary motor actuated by and flexibly connected to the primary motor, a frame on said trailer in which said secondary motor may be seated, brake operating means on said frame operatively engaged by said secondary motor when seated therein, means pivoted in said frame for supporting said secondary motor therein, a pivoted plate for normally preventing movement of said motor supporting means, a spring tending to move said plate to release said motor supporting means, a trigger for preventing movement of said plate, means operating automatically with a separation of the truck and trailer for moving said trigger to release the plate, and a lever linked to said plate for engaging said brake operating means.

26. A truck trailer brake controlling apparatus comprising a primary motor on the truck, a secondary motor actuated by and flexibly connected to the primary motor, a base plate at each end of said trailer, a frame interchangeably and detachably connectible to said base plates and in which said secondary motor may be seated, brake operating means on said frame operatively engaged by said secondary motor when seated therein, and means operating automatically with a separation of the truck and trailer for ejecting said secondary motor from said frame.

27. A truck trailer brake controlling apparatus comprising a primary motor on the truck, a secondary motor actuated by and flexibly connected to the primary motor, a base plate at each end of said trailer, a frame interchangeably and detachably connectible to said base plates and in which said secondary motor may be seated, brake operating means on said frame operatively engaged by said secondary motor when seated therein, and means operating automatically with a separation of the truck and trailer for ejecting said secondary motor from said frame, and for simultaneously actuating said brake operating means.

28. A truck trailer brake controlling apparatus comprising a primary motor on the truck, a secondary motor actuated by and flexibly connected to the primary motor, a frame on said trailer in which said secondary motor may be seated, brake operating means on said frame operatively engaged by said secondary motor when seated therein, a lever for manually actuating said operating means, a pivotally mounted plate on said frame, a spring tending to rotate said plate, a lever arm linked to said plate and operatively engageable with said manually operated lever when said plate rotates, a trigger for preventing the rotation of said plate, means operating automatically with a separation of the truck and trailer for moving said trigger to permit said spring to rotate said plate, and means simultaneously released by said plate for causing the ejection of said secondary motor from said frame.

29. A truck trailer brake controlling apparatus comprising a primary motor on the truck, a secondary motor actuated by and flexibly connected to the primary motor, a frame on said trailer in which said secondary motor may be seated, brake operating means on said frame operatively engaged by said secondary motor when seated therein, means independent of said secondary motor for actuating said brake operating means, and means operating automatically with a separation of the truck and trailer for ejecting said secondary motor from said frame and initiating the operation of said independent means.

30. The combination of a primary motor, a secondary motor actuated by said primary motor, a device to be moved, means for releasably holding said secondary motor in operative engagement with said device and means for automatically releasing said secondary motor from said operative engagement.

31. The combination of a primary motor, a secondary motor actuated by said primary motor, a device to be moved, means for releasably holding said secondary motor in operative engagement with said device, means for automatically releasing said secondary motor from said operative engagement and means operating automatically and simultaneously with said release for moving said device.

32. The combination with a primary motor, a secondary motor actuated by said primary motor, mechanism to be operated, means for manually operating said mechanism, means for releasably coupling said secondary motor to said manual operating means and means for automatically releasing said secondary motor from said manual operating means.

33. The combination with mechanism to be actuated, of a motor for actuating said mechanism, means for releasably coupling the motor to said mechanism and means for automatically releasing the motor from said mechanism.

34. The combination with mechanism to be actuated, of a motor for actuating said mechanism, means for releasably holding the motor in operative engagement with said mechanism and means for automatically releasing the motor from said engagement.

35. The combination with mechanism to be actuated, of a motor for actuating said mechanism, secondary means for actuating the mechanism, means for releasably coupling the motor to said mechanism and means actuated simultaneously with the release of the motor for throwing said secondary means into operation.

36. The combination with mechanism to be actuated, of a motor for actuating said mechanism, secondary means for actuating said mechanism, means for releasably coupling the motor to said mechanism and automatic means for simultaneously releasing the motor from co-operation with said mechanism and throwing the secondary means into operation.

37. The combination with mechanism to be actuated, of a motor for actuating said mechanism, secondary means for actuating said mechanism, means for holding said motor in coupled engagement with said mechanism and for holding the secondary means inoperative and means for releasing the motor from engagement and throwing the secondary means into operation.

38. The combination with mechanism to be actuated, of a motor for actuating said mechanism, secondary means for actuating said mechanism, means for holding said motor in coupled engagement with said mechanism and for holding the secondary means inoperative and means for simultaneously releasing said motor and secondary means.

39. The combination with a manually operated primary motor and a secondary motor operated thereby and in time therewith, of mechanism to be moved releasably connected to the secondary motor and means operative by the release of said secondary motor for moving said mechanism.

40. The combination with mechanism to be actuated, of a socket associated with said mechanism, a motor, means in the socket for releasably holding said motor in operative connection with said mechanism, and means for actuating said releasing means.

41. The combination with a plurality of coupled vehicles, of a brake on one vehicle, a primary motor on the other vehicle, a secondary motor on the first vehicle operative in time with the primary motor and connected to said brake, and means connecting said vehicles operative to release the secondary motor from said brake.

42. The combination with a vehicle having a brake, of a motor releasably coupled to said brake and operative to apply said brake, secondary means for applying said brake normally held out of action and means for releasing said motor from connection with said brake and releasing said secondary means to apply the brake.

43. The combination with a plurality of connected vehicles, of a brake on one vehicle, means on said vehicle operative to apply the brake and normally held inactive, means on the other vehicle releasably coupled to said brake for applying the same and means operative by the release of said second means for throwing the first means into action.

44. The combination with a truck and a trailer provided with a brake, of means on the truck connected to the trailer brake for applying said brake and means for automatically disconnecting the operating means from the trailer brake.

45. The combination with a truck and a trailer provided with a brake, of means on the trailer for applying the brake, means carried by the truck and releasably connected to the brake for applying the brake and holding the means on the trailer inactive and means for automatically disconnecting the releasably connected means from the trailer.

In testimony whereof, I have hereunto set my hand.

HORACE L. HIRSCHLER.